US008568842B2

(12) United States Patent
Anderson et al.

(10) Patent No.: US 8,568,842 B2
(45) Date of Patent: Oct. 29, 2013

(54) FILM FOR WRAPPING, METHODS OF MAKING AND USING

(75) Inventors: Dennis W. Anderson, Goshen, OH (US); Patti L. Ewing, Memphis, TN (US)

(73) Assignee: International Paper Company, Memphis, TN (US)

( * ) Notice: Subject to any disclaimer, the term of this patent is extended or adjusted under 35 U.S.C. 154(b) by 478 days.

(21) Appl. No.: 12/979,649

(22) Filed: Dec. 28, 2010

(65) Prior Publication Data

US 2012/0160722 A1 Jun. 28, 2012

(51) Int. Cl.
*B29D 22/00* (2006.01)
*B29D 23/00* (2006.01)
*B32B 1/08* (2006.01)

(52) U.S. Cl.
USPC ......... 428/35.7; 428/195.1; 206/410; 53/461; 53/463; 427/256; 156/290

(58) Field of Classification Search
USPC ......... 428/35.7, 195.1; 206/410; 53/461, 463; 427/256; 156/290
See application file for complete search history.

(56) References Cited

U.S. PATENT DOCUMENTS

| | | | |
|---|---|---|---|
| 1,702,325 | A | 2/1929 | Van Sickles |
| 2,354,989 | A | 8/1944 | Fusco |
| 2,638,724 | A | 5/1953 | Harvey |
| 2,697,474 | A | 12/1954 | Mc Ginley |
| 2,996,235 | A | 8/1961 | Turpin |
| 3,066,848 | A | 12/1962 | Billeb |
| 3,184,144 | A | 5/1965 | Greene et al. |
| 3,230,135 | A | 1/1966 | Hurst |
| 3,310,225 | A | 3/1967 | Hoblit et al. |
| 3,404,771 | A | 10/1968 | Mann |
| 3,648,833 | A | 3/1972 | Dash |
| 3,750,361 | A | 8/1973 | Stevens |
| 3,784,434 | A | 1/1974 | Paisley et al. |
| 3,788,933 | A | 1/1974 | Nakazawa |
| RE28,317 | E | 1/1975 | Goodrich |
| 3,932,260 | A | 1/1976 | Balentine, Jr. |
| 3,993,532 | A | 11/1976 | McDonald et al. |
| 4,079,570 | A | 3/1978 | Rucker |
| 4,081,580 | A | 3/1978 | Kato |
| 1,548,226 | A | 7/1979 | Robert William Clarke |
| 4,192,420 | A | 3/1980 | Worrell, Sr. et al. |
| 4,473,432 | A | 9/1984 | Leader et al. |
| 4,572,753 | A | 2/1986 | Bach |
| 4,647,325 | A | 3/1987 | Bach |
| 4,744,467 | A | 5/1988 | Jonsson et al. |
| 4,854,984 | A | 8/1989 | Ball et al. |
| 4,914,892 | A | 4/1990 | Saito et al. |
| 5,058,361 | A | 10/1991 | Schmacher |
| 5,072,572 | A | 12/1991 | Meives et al. |

(Continued)

FOREIGN PATENT DOCUMENTS

| | | |
|---|---|---|
| CA | 1198349 | 12/1985 |
| DE | 4336274 | 4/1995 |

(Continued)

*Primary Examiner* — Michael C Miggins
(74) *Attorney, Agent, or Firm* — Thomas W. Barnes, II

(57) ABSTRACT

One embodiment of a wrapping film comprises a polymer film having, on at least one surface thereof, at least one sealing area comprising at least one varnished area; and a plurality of individual unvarnished areas; wherein, within the sealing area, the area ratio of the unvarnished areas to the varnished area (PV:V) is ≤1; and wherein, within the sealing area, the largest individual unvarnished area is ≤30 mm$^2$. Other embodiments are described.

14 Claims, 20 Drawing Sheets

(56) References Cited

U.S. PATENT DOCUMENTS

| | | | |
|---|---|---|---|
| 5,175,978 | A | 1/1993 | Knauf |
| 5,250,348 | A | 10/1993 | Knauf |
| 5,421,512 | A | 6/1995 | Poole |
| 5,954,201 | A | 9/1999 | Finch et al. |
| 6,338,572 | B1 | 1/2002 | Schneck |
| 6,601,706 | B2 | 8/2003 | McManus et al. |
| 6,640,522 | B2 | 11/2003 | Antoniazzi et al. |
| 6,681,934 | B2 | 1/2004 | Kolterjohn et al. |
| 6,705,465 | B2 | 3/2004 | Ling et al. |
| 7,297,410 | B2 | 11/2007 | Nowak et al. |
| 2002/0022114 | A1 | 2/2002 | Sorensen et al. |
| 2002/0060167 | A1 | 5/2002 | Nichols et al. |
| 2002/0063076 | A1 | 5/2002 | Kolterjohn et al. |
| 2003/0023217 | A1 | 1/2003 | McManus et al. |
| 2004/0157025 | A1 | 8/2004 | Knauf |
| 2005/0202191 | A1 | 9/2005 | Nowak et al. |
| 2006/0027637 | A1 | 2/2006 | Conrad et al. |
| 2008/0264561 | A1 | 10/2008 | Laue et al. |
| 2008/0302067 | A1 | 12/2008 | De Oliveira |
| 2009/0001143 | A1 | 1/2009 | Cowan et al. |
| 2009/0183469 | A1 | 7/2009 | Knauf |
| 2009/0218032 | A1 | 9/2009 | Shimizu et al. |
| 2009/0292266 | A1 | 11/2009 | Back |

FOREIGN PATENT DOCUMENTS

| | | |
|---|---|---|
| DE | 4441006 | 5/1996 |
| EP | 0351553 | 6/1989 |
| EP | 1288141 | 3/2003 |
| EP | 1393848 | 8/2003 |
| GB | 615594 | 1/1949 |
| GB | 1336217 | 11/1973 |
| GB | 13336217 | 11/1973 |
| WO | 02085711 | 10/2002 |
| WO | 2006001889 | 1/2006 |
| WO | 2009082277 | 7/2009 |
| WO | 2011057368 | 5/2011 |

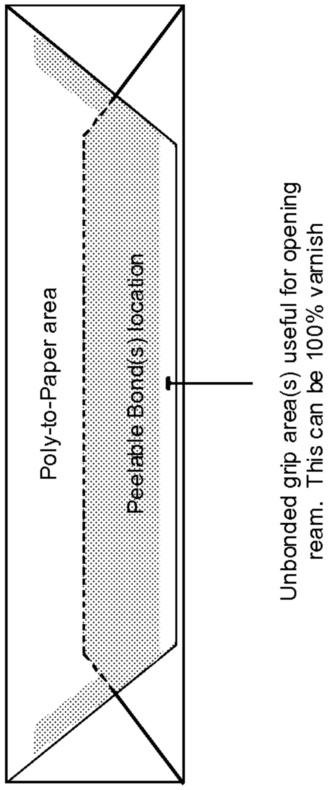
Figure 15: End view of sealed ream
Shaded area shows peelable bond(s) location

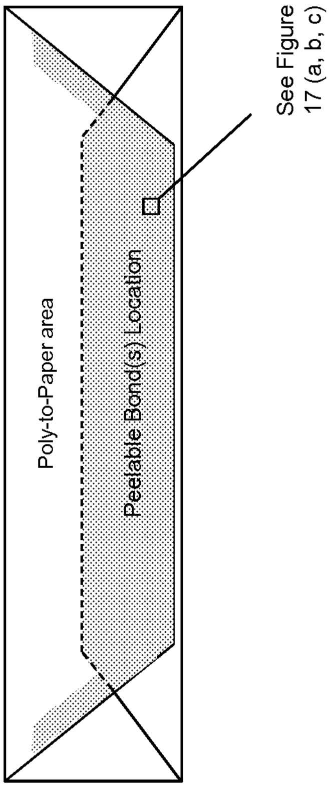
Figure 16 End view of sealed ream
Shaded area shows peelable bond(s)
location Table I part I.

Table I part II.

Table I part III.

FILM FOR WRAPPING, METHODS OF MAKING AND USING

BACKGROUND

Field of the Invention

The invention relates to an improved product wrap and methods of making and using same.

BRIEF DESCRIPTION OF THE FIGURES

Various embodiments are described in conjunction with the accompanying figures, in which:

FIG. 15 shows another embodiment of an end seal of a ream wrap.

FIG. 16 shows another embodiment for end seals in a ream wrap.

FIG. 17A shows small print voids (1 mm effective diameter) in varnish pattern design, which are poly-poly bonding areas; PV:V approaching 1.0. FIG. 17B shows micro print voids (0.4 mm effective diameter) in varnish pattern, which are poly-poly bonding areas; PV:V<0.1. FIG. 17C shows microspheres distributed randomly in varnish, which serve as bonding points to poly wrap.

DETAILED DESCRIPTION OF THE SEVERAL EMBODIMENTS

Figure 1:
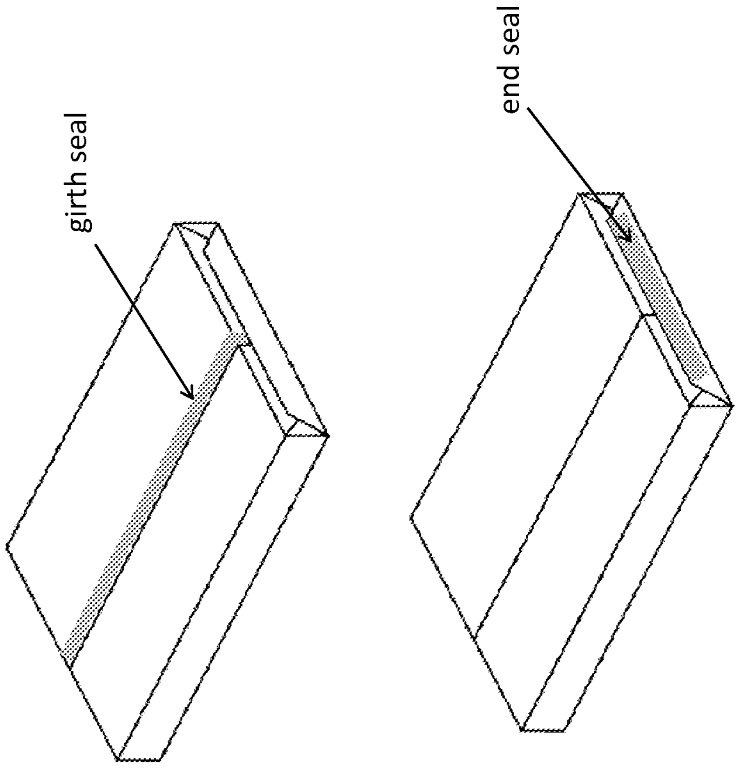
FIG. 1 shows one embodiment of a wrapped ream with end seal and girth seal locations.

One embodiment relates to a wrapping film, comprising:

a polymer film having, on at least one surface thereof, at least one sealing area comprising:

at least one varnished area; and a plurality of individual unvarnished areas;

wherein, within the sealing area, the area ratio of the unvarnished areas to the varnished area (PV:V) is ≤1;

and wherein, within the sealing area, the largest individual unvarnished area is ≤30 $mm^2$.

Another embodiment relates to a method for making a wrapping film, comprising:

forming, on at least one surface of a polymer film, a sealing area comprising:

at least one varnished area; and a plurality of individual unvarnished areas;

wherein, within the sealing area, the area ratio of the unvarnished areas to the varnished area (PV:V) is ≤1;

and wherein, within the sealing area, the largest individual unvarnished area is ≤30 $mm^2$.

Another embodiment relates to a method for making a wrapping film, comprising:

forming, on at least one surface of a polymer film, a sealing area comprising:

at least one varnished area; and a plurality of individual unvarnished areas;

and contacting at least a portion of the polymer film with the ream of paper;

wherein, within the sealing area, the area ratio of the unvarnished areas to the varnished area (PV:V) is ≤1;

and wherein, within the sealing area, the largest individual unvarnished area is ≤30 $mm^2$.

Another embodiment relates to a method for wrapping an article, comprising:

forming, on at least one surface of a polymer film, a sealing area comprising:

at least one varnished area; and a plurality of individual unvarnished areas;

contacting the surface with a second surface of the polymer film; and applying energy to at least one of the unvarnished areas to form a peelable bond between the surfaces within the sealing area;

wherein, within the sealing area, the area ratio of the unvarnished areas to the varnished area (PV:V) is ≤1;

and wherein, within the sealing area, the largest individual unvarnished area is ≤30 $mm^2$.

Another embodiment relates to a wrapped article, comprising:

an article wrapped with a polymer film having, on at least one surface thereof, at least one peelable bond comprising:

at least one varnished, unbonded area; and a plurality of individual bonded areas;

wherein, within the peelable bond, the area ratio of the bonded areas to the varnished, unbonded area (BA:VUB) is ≤1;

and wherein, within the peelable bond, the largest individual bonded area is ≤30 $mm^2$.

Another embodiment relates to a wrapping film, comprising:

a polymer film having first and second surfaces and, on the first surface, at least one sealing area, comprising:

a coating comprising varnish and microspheres dispersed in the varnish.

Another embodiment relates to a method for making a wrapping film, comprising:

forming, on at least one surface of a polymer film, a sealing area comprising:

a coating comprising varnish and microspheres dispersed in the varnish.

Another embodiment relates to a method for wrapping an article, comprising:

contacting an article with a polymer film;

contacting a first surface of the polymer film with a second surface of the polymer film; and applying energy to at least a portion of the surfaces to form a peelable bond between the surfaces, the peelable bond comprising:

a coating comprising varnish and microspheres dispersed in the varnish, the microspheres bonding the first and second surfaces together.

Another embodiment relates to a wrapped article, comprising:

an article wrapped with a polymer film, the polymer film comprising:

first and second surfaces; and a peelable bond between the first and second surfaces;

wherein the peelable bond comprises:

a coating comprising varnish and microspheres dispersed in the varnish, the microspheres bonding the first and second surfaces together.

Another embodiment relates to a method for wrapping an article, comprising:

contacting an article with a polymer film;

contacting a first surface of the polymer film with a second surface of the polymer film; and applying energy to at least a portion of the surfaces to form a peelable bond between the surfaces, the peelable bond comprising:

at least one unbonded area; and a plurality of individual bonded areas;

wherein, within the peelable bond, the area ratio of the bonded areas to the unbonded area (BA:UB) is ≤1;

and wherein, within the peelable bond, the largest individual bonded area is ≤30 $mm^2$.

Another embodiment relates to a wrapped article, comprising:

an article wrapped with a polymer film having, on at least one surface thereof, at least one peelable bond comprising:

at least one unbonded area; and a plurality of individual bonded areas;

wherein, within the peelable bond, the area ratio of the bonded areas to the unbonded area (BA:UB) is ≤1;

and wherein, within the peelable bond, the largest individual bonded area is ≤30 $mm^2$.

In another embodiment, the wrapping film may comprise:

a polymer film having, on at least one surface thereof, at least one sealing area comprising:

a varnished area; and a plurality of individual unvarnished areas in the varnished area;

wherein, within the sealing area, the area ratio of the unvarnished areas to the varnished area (PV:V) is ≤1;

and wherein, within the sealing area, the largest individual unvarnished area is ≤30 $mm^2$.

In another embodiment, the method for making a wrapping film comprises:

forming, on at least one surface of a polymer film, a sealing area comprising:

a varnished area; and a plurality of individual unvarnished areas in the varnished area;

wherein, within the sealing area, the area ratio of the unvarnished areas to the varnished area (PV:V) is ≤1;

and wherein, within the sealing area, the largest individual unvarnished area is ≤30 $mm^2$.

In another embodiment, the method for making a wrapping film comprises:

forming, on at least one surface of a polymer film, a sealing area comprising:

a varnished area; and a plurality of individual unvarnished areas in the varnished area;

and contacting at least a portion of the polymer film with the ream of paper;

wherein, within the sealing area, the area ratio of the unvarnished areas to the varnished area (PV:V) is ≤1;

and wherein, within the sealing area, the largest individual unvarnished area is ≤30 $mm^2$.

In another embodiment, the method for wrapping an article comprises:

forming, on at least one surface of a polymer film, a sealing area comprising:

a varnished area; and a plurality of individual unvarnished areas in the varnished area;

contacting the surface with a second surface of the polymer film; and applying energy to at least one of the unvarnished areas to form a peelable bond between the surfaces within the sealing area;

wherein, within the sealing area, the area ratio of the unvarnished areas to the varnished area (PV:V) is ≤1;

and wherein, within the sealing area, the largest individual unvarnished area is ≤30 $mm^2$.

In another embodiment, the wrapped article comprises:

an article wrapped with a polymer film having, on at least one surface thereof, at least one peelable bond comprising:

an varnished, unbonded area; and a plurality of individual bonded areas in the unbonded area;

wherein, within the peelable bond, the area ratio of the bonded areas to the varnished, unbonded area (BA:VUB) is ≤1;

and wherein, within the peelable bond, the largest individual bonded area is ≤30 $mm^2$.

In another embodiment, the method for wrapping an article comprises:

contacting an article with a polymer film;

contacting a first surface of the polymer film with a second surface of the polymer film; and applying energy to at least a portion of the surfaces to form a peelable bond between the surfaces, the peelable bond comprising:

an unbonded area; and a plurality of individual bonded areas in the unbonded area;

wherein, within the peelable bond, the area ratio of the bonded areas to the unbonded area (BA:UB) is ≤1;

and wherein, within the peelable bond, the largest individual bonded area is ≤30 $mm^2$.

In another embodiment, the wrapped article comprises:

an article wrapped with a polymer film having, on at least one surface thereof, at least one peelable bond comprising:

an unbonded area; and a plurality of individual bonded areas in the unbonded area;

wherein, within the peelable bond, the area ratio of the bonded areas to the unbonded area (BA:UB) is ≤1;

and wherein, within the peelable bond, the largest individual bonded area is ≤30 $mm^2$.

Poly-wrapped articles, products, and the like, are known. One example of such an article is a wrapped ream of paper. For ream wraps, it is known that seals, e.g., end seals, girth seals, and the like may be made in a poly wrapping by fusing two layers of the poly wrapping material together with heat or other energy. While this method can result in a robust seal, the present inventors have found that such wraps are difficult to open, or are opened only by tearing the wrapping. Easy open packaging is known but is either not sufficiently durable, e.g., resistant to opening, or does not provide adequate protection, e.g., moisture resistance, to the wrapped article or product.

The present inventors have found that conventional poly-to-poly bonds in package wrapping provide too strong of a seal, with the result that the package is difficult to open or difficult to open without tearing the wrapping itself. The present inventors have also found that conventional easy open packages are not durable or do not provide an adequate seal for the product against moisture and the like.

The polymer film is not particularly limited, so long as it is suitable for use as a wrapping material. Non-limiting examples include films comprising or made from any one or more of polymeric material, synthetic paper, organic polymer, biopolymer, carbohydrate, polysaccharide, starch, cellulose, glycogen, hemi-cellulose, chitin, fructan inulin, lignin, pectic substance, gum, protein, cereal, vegetable protein, animal protein, gluten (e.g. from wheat), whey protein, gelatin, colloid (e.g., natural hydro-colloid, polylactic, polygalactic, cellulosic film (e.g. microbial and/or regenerated cellulose film), thermoplastic polymer, thermoset polymer, polyolefin, (e.g. polypropylene and/or polyethylene, LDPE, HDPE), polystyrene, polyurethane, polyvinylhalide (e.g. PVC), polyester (e.g. polyethylene terephthalate—PET), polyamide (e.g. nylon), biaxially oriented polypropylene (BOPP), non-hydrocarbon polymer, homopolymer, copolymer, oriented polymer, or the like, or any combination of two or more thereof. The polymer film may be single layer or multilayer, wherein each layer may be the same or different material. The polymer film may also include one or more paper layers, if desired. The polymer film may be a monolithic sheet or composite sheet formed by any suitable combination and/or mixture of any of the foregoing material. Methods of forming such polymer films are known, and may include extrusion, blowing, co-extrusion, laminating, and the like, or any combination of two or more thereof.

The polymer film may have one or more coatings thereon. Non-limiting examples of coatings include hot melt adhesive, polyamine, polyalkeneimine, polyethyleneimine, polyaziridine, polyester, nylon, polyethylene terephthalate, and combination of two or more thereof.

In one embodiment, the polymer film comprises biaxially oriented polypropylene (BOPP). In one embodiment, the BOPP film may have machine direction and transverse direction stretch ratios independently ranging from 4:1 to 10:1. These ratios include all values and subranges therebetween, for example, 4, 5, 6, 7, 8, 9, and 10:1.

The thickness of the polymer film is not particularly limited. Non-limiting examples of film thickness include 10 to 500 microns thick, although the film may be thinner or thicker as appropriate. The aforementioned range includes all values and subranges therebetween, including 10, 20, 30, 40, 50, 60, 70, 80, 90, 100, 200, 300, 400, and 500 microns or any combination thereof. In one embodiment, the polymer film has a thickness ranging from about 30 to about 160 microns thick. In another embodiment, the polymer film has a thickness ranging from about 50 to about 60 microns thick.

The polymer film may be clear or may contain a colorant or filler. The polymer film may include a printed image such as, for example, a text or other image describing the article packaged therein. Methods for printing such polymer films are known.

In one embodiment, the polymer film is clear BOPP having a thickness of 30 to 160 microns.

The wrapping film is particularly suitable for wrapping reams of paper, but its use is not so limited. The wrapping film may be suitably used to wrap or package any article. Non-limiting examples of articles which can be wrapped or packaged with the wrapping film include consumer items, for example, toy, board game, compact disc, electronic item, boxed item, and others; food items, for example, cookie and/or cracker box, multi-pack item (e.g., case of water bottles, pack of diapers, etc.); office supply item, for example, ream of paper, etc.

In one embodiment, however, the article to be wrapped is a ream of paper. Wrapping films are known in this context as ream wraps. Methods and machines for wrapping reams of paper are known. Non-limiting examples of machines that can be used in wrapping reams of paper are described in e.g. U.S. Pat. No. 3,750,361 and U.S. Pat. No. 5,072,572, the entire contents of which are hereby incorporated by reference.

Typically, to wrap a ream of paper, a web of polymer film is fed to a severing station where a length of film is cut off to form a sheet of sufficient size to be used as a wrapper around a stack of paper, e.g., a ream of paper. The stack of paper is then contacted with the sheet, and the sheet is then folded around the stack to overlap on itself and form a rectangular tube along the length of the stack and overlapping it at each end. Heat or other energy is then applied to form an overlapped girth seal along the length of the sheet to bond the surfaces at the overlapped portion. Each end of the tube is then tucked in and folded to form a so-called envelope seal with two overlapping trapezoidal shaped flaps. Heat or other energy is then applied to form a seal at each end of the wrapped stack to seal the two flaps overlap. FIG. 1 shows one embodiment of a wrapped ream with end seal and girth seal locations.

In one embodiment, a ream of A4 size 80 gsm paper will have a length of about 300 mm, a width of about 210 mm and a depth of about 50 mm. Such a stack can be wrapped using a single sheet of wrapping film. In order to wrap a ream of 500 sheets of A4 paper, the wrapping film sheet may have a size of about 570 by 390 mm.

When used herein, the term, "varnish" means a coating, such as a heat shielding varnish coating, which, when applied to a polymer film surface, prevents that surface from bonding to another surface of the polymer film under the application of energy that, in the absence of the coating, would normally bond the two surfaces together. Heat shielding varnishes are known and described, for example, in U.S. Patent Pub. 2004/0157025.

So long as the varnish prevents the coated polymer film surface from bonding to another surface of the polymer film, the varnish is not particularly limited. Non-limiting examples of varnish include acrylic polymer, styrenated acrylic polymer, styrene butadiene rubber (SBR) latex, polyvinyildene chloride, silicone, latex, ink, epoxy, polyurethane, rosin, rosin alkyl ester, rosin methyl ester, hydrogenated rosin alky ester, hydrogenated methyl ester of rosin, or a combination of any two or more thereof, each independently and optionally including one or more of clay, kaolin clay, ink, pigment, dye, colorant, or a combination of any two or more thereof. In one embodiment, the varnish is a styrenated acrylic polymer latex, kaolin clay, and ink. A non-limiting example of a commercially available varnish, PRINTPACK ANTI-SKID LACQUER™, a hydrogenated methyl ester of rosin composition, is available from Printpack, Inc.

The method of applying varnish to the polymer film is not particularly limited. Non-limiting examples of applying the varnish include brushing, rolling, spraying, printing, ink-jetting, flexo, or any combination of two or more thereof.

Once applied, the varnish may be cured or dried with radiative or non-radiative processes. For example, the varnish may be cured or dried under flowing air or other gas, under heat, under UV radiation, electron beam, etc., or any combination of two or more thereof.

Figure 2:
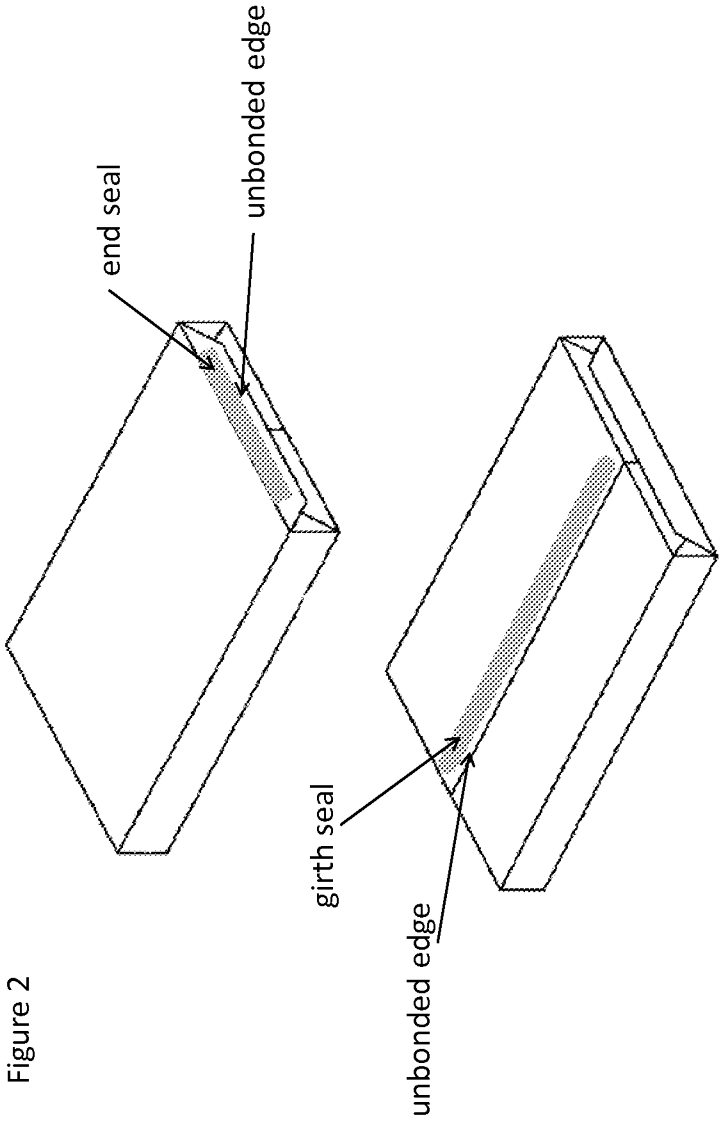
FIG. 2 shows one embodiment of a ream wrap having a seal and an unbonded edge.
Figure 3:
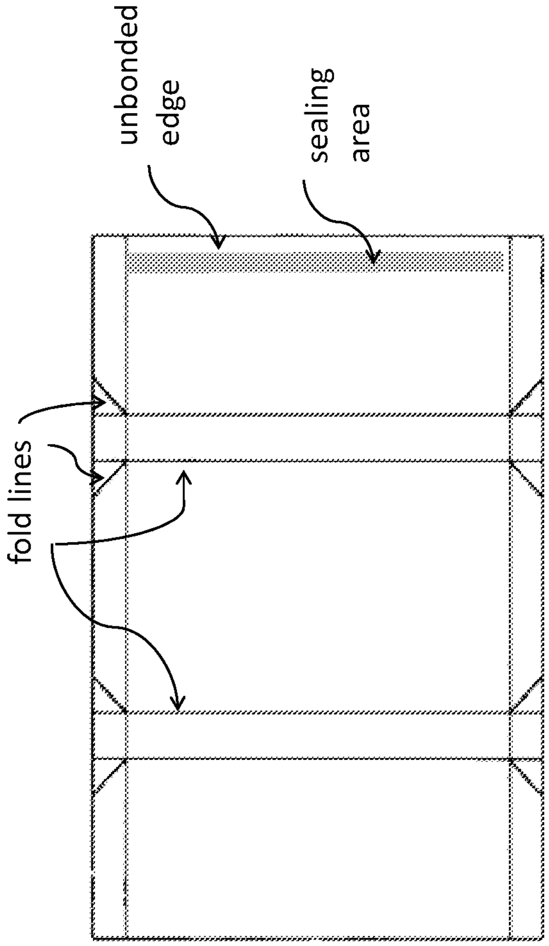
FIG. 3 shows one embodiment of a polymer film for a ream wrap.
Figure 4:
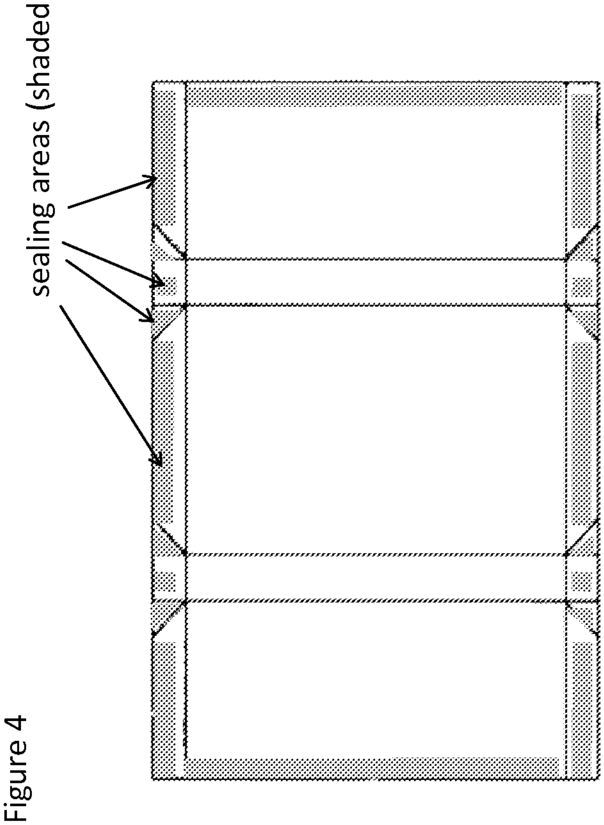
FIG. 4 shows another embodiment of a polymer film for a ream wrap.

The effect of the varnish is to prevent bonding between those areas of facing surfaces one or more of which have a varnish coating. Varnish may be selectively applied to one or more areas of a polymer film surface at which bonding is not desired. Varnish need be applied to only one surface to prevent bonding of that surface to another surface. For example, in one embodiment, varnish is applied lengthwise along an outer edge portion of a polymer film to prevent bonding at that portion. The result is an unbonded edge, which can be grasped by the consumer and pulled to aid opening the package. FIG. 2 shows one embodiment of a ream wrap having a seal and an unbonded edge. FIG. 3 shows one embodiment of a polymer film for a ream wrap with possible fold lines shown (as lines), some of which are labeled, a sealing area (shaded area), and an unbonded edge along the girth. FIG. 4 shows another embodiment of a polymer film for a ream wrap with possible locations of sealing areas (shaded areas), some of which are labeled.

When used herein, the term, "sealing area" means a location on the polymer film that comprises at least one varnished area and a plurality of unvarnished areas. In one embodiment, within the sealing area, the varnished area and unvarnished areas may be in a "sea/island" relationship, wherein the unvarnished areas appear as discrete "islands" spaced apart from one another in an otherwise continuous "sea" of varnish. In another embodiment, the sealing area comprises a plurality of varnished and unvarnished areas arranged in an alternating or checkerboard pattern.

The boundary of the sealing area may be defined in one embodiment by a continuous line around the outermost portion of the pattern of varnished and unvarnished areas.

Figure 5:
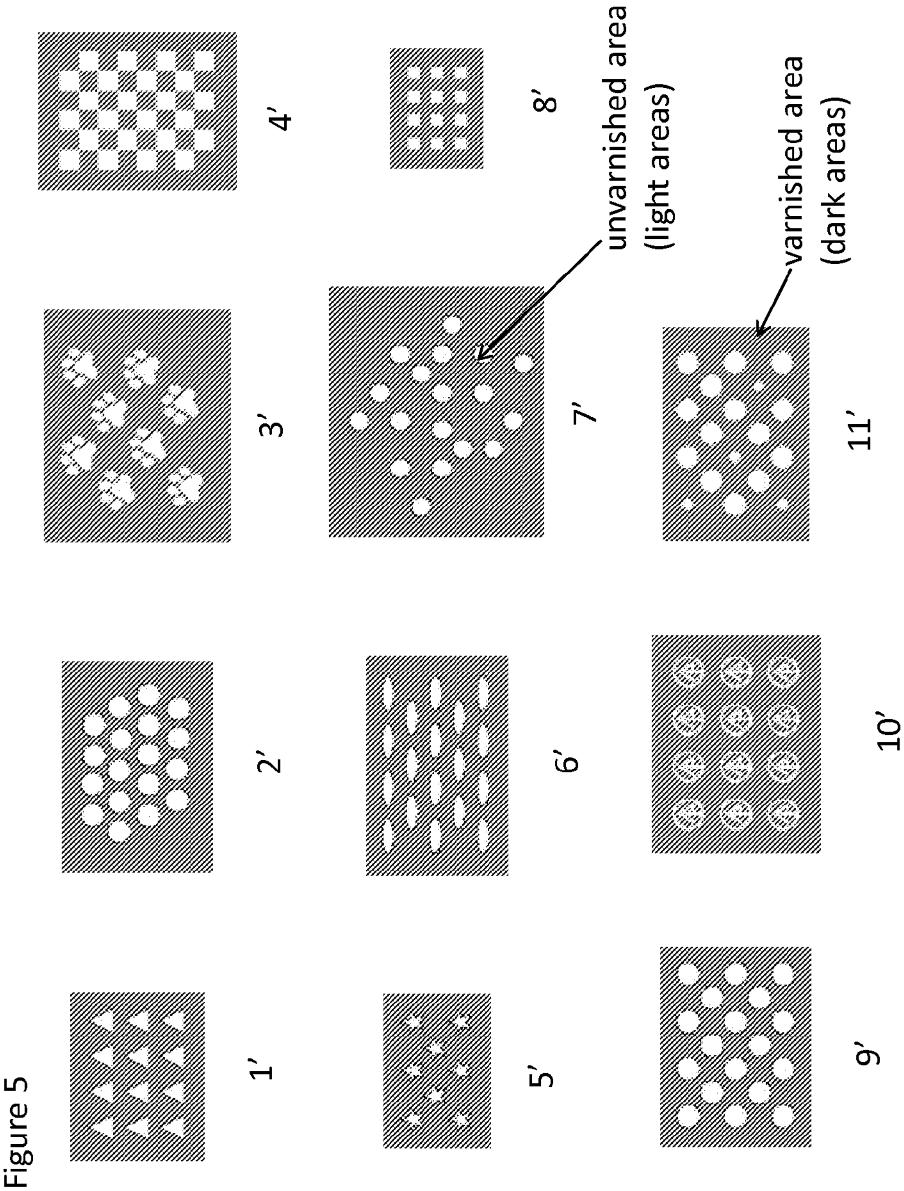
FIG. 5 shows some embodiments of patterns of unvarnished areas (light areas) and varnished areas (dark area).

In one embodiment, wherein the sealing area comprises a regular repeating pattern of varnished and unvarnished areas, the sealing area may be defined as the area within a boundary established by a plurality of repeating unit cells. The term, "unit cell" means an imaginary parallelpiped that contains one unit of the translationally repeating pattern of varnished and unvarnished areas. In one embodiment, the unit cell is the fundamental unit from which the entire sealing area of a regular repeating pattern may be constructed by purely translational displacements. In one embodiment, the corners of the unit cell are located at the lattice points of the repeating pattern of unvarnished and varnished areas. For a regular repeating pattern of unvarnished and varnished areas, the sealing area is the sum of the areas of the unit cells therein. Non-limiting examples of regular repeating patterns of unvarnished areas (light areas) are shown in FIG. 5, elements 1-6 and 8-10 therein. Upon sealing, regular repeating areas of poly-poly bonds form in all or a portion of the unvarnished areas, which bonds correspond to the dark areas shown in FIG. 6. In FIG. 5, for example, all or a portion of the unvarnished (light) areas 1', 2', 3', etc., correspond, upon sealing, to the bonded (dark) areas 1, 2, 3, etc., respectively, shown in FIG. 6.

Figure 7:
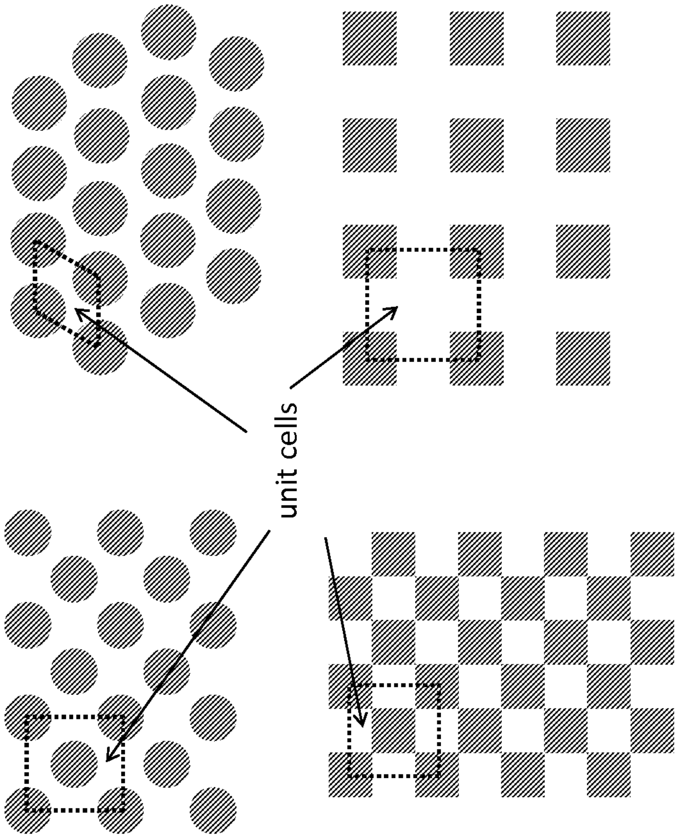
FIG. 7 shows some embodiments of unit cells for some embodiments of regular repeating patterns.
Figure 8:
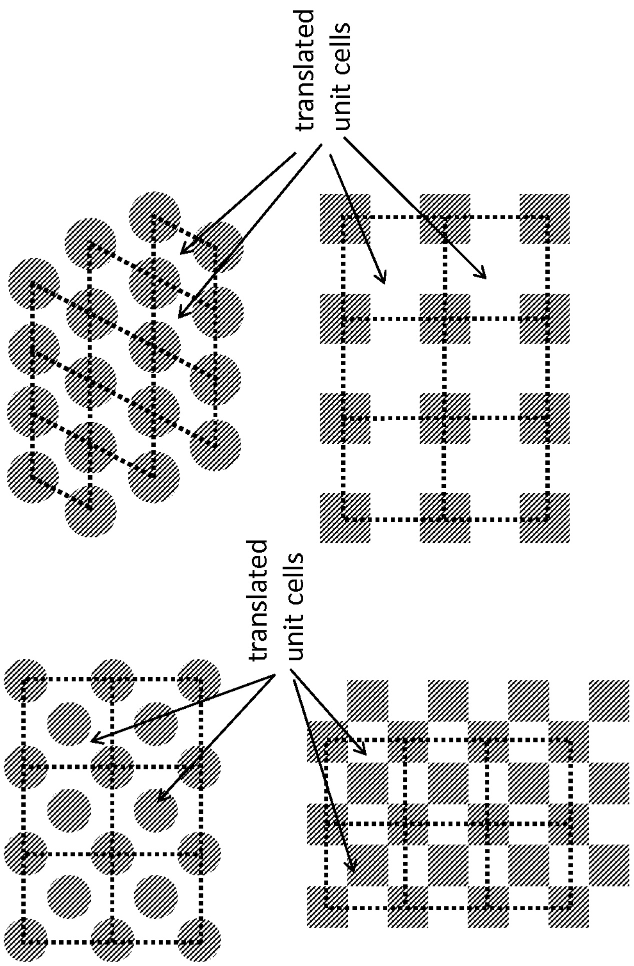
FIG. 8 shows some embodiments of unit cells translated throughout some embodiments of sealing areas.
Figure 9:
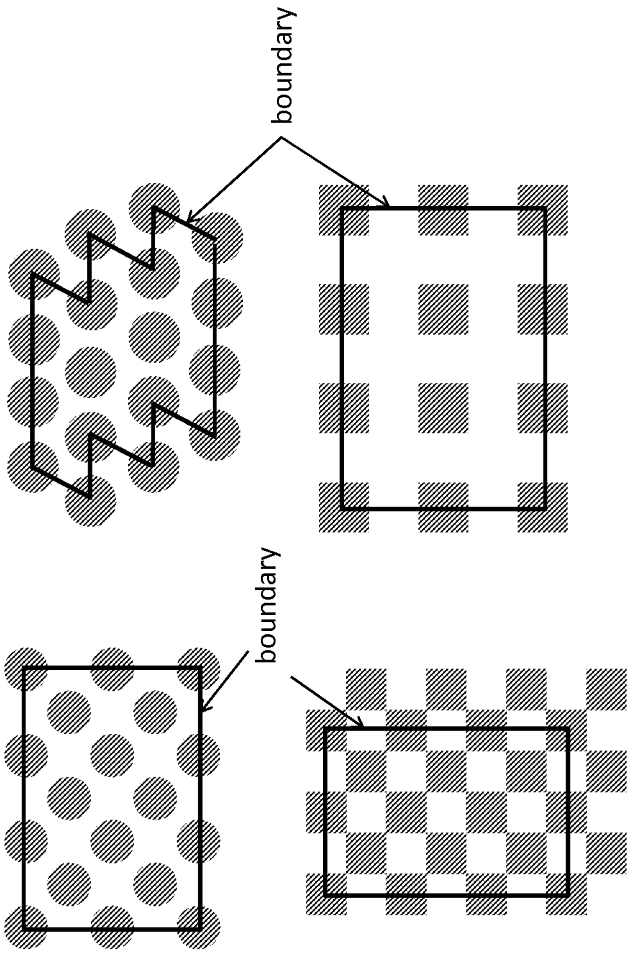
FIG. 9 shows some embodiments of sealing area boundaries formed by a pluralities of translated unit cells

Examples of unit cells for some embodiments of regular repeating patterns are shown in FIG. 7. Examples of unit cells translated throughout the sealing area are shown in FIG. 8. Examples of the sealing area boundary formed by a plurality of translated unit cells are shown in FIG. 9.

In another embodiment, the sealing area comprises a random pattern of varnished and unvarnished areas, the sealing area may be defined as the area within a boundary established by the superposition of circles formed about radii, the length of which radii are determined by the distance between the geometric centers of nearest varnished or unvarnished neighbors in the pattern. In the case of a random pattern, a unit cell does not exist. Non-limiting examples of random patterns are shown at elements 7, 7', 11, and 11' in FIGS. 5 and 6.

Figure 10:
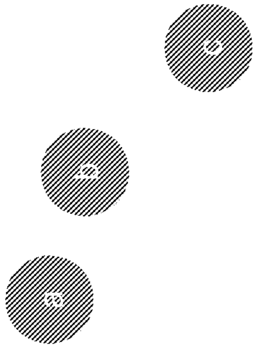
FIG. 10 shows one embodiment of a random pattern.
Figure 11:
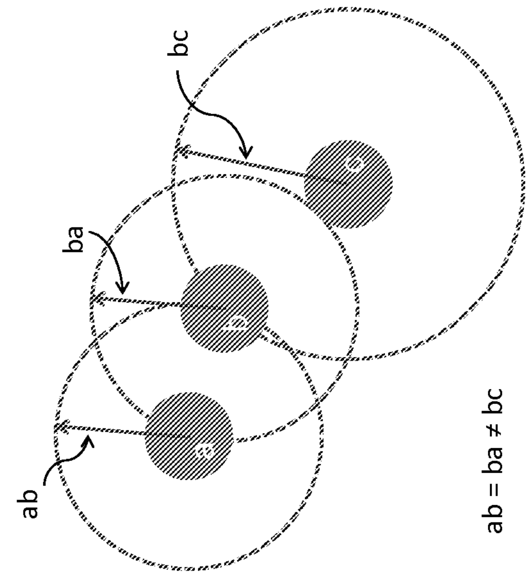
FIG. 11 shows one embodiment of radii between the geometric centers of nearest neighbors ab, ba, and bc, and the corresponding circles for the random pattern shown in FIG. 10.
Figure 12:
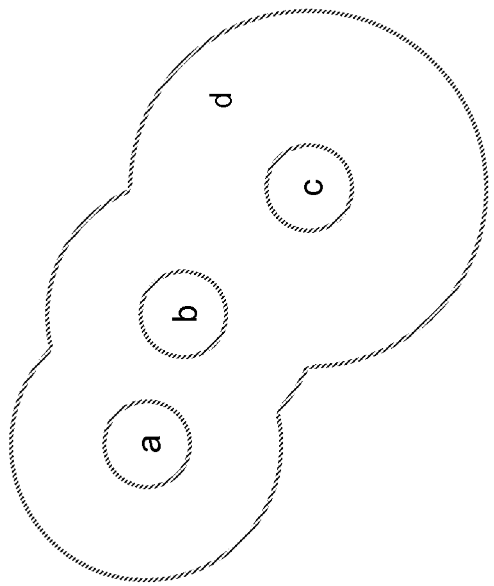
FIG. 12 shows one embodiment of the boundary of the sealing area which results from the superposition of circles established in FIG. 11.
Figure 13:
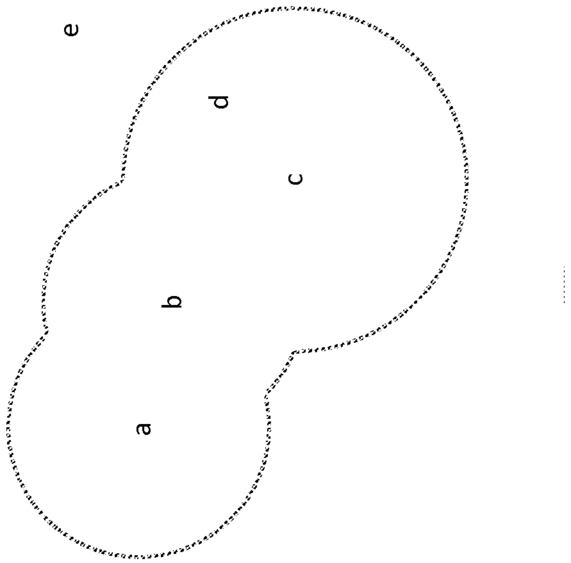
FIG. 13 shows another embodiment of the boundary of the sealing areas established in FIG. 12 within a sea of varnish.

The determination of the sealing area for a random pattern is best illustrated graphically, such as shown in FIGS. 10-13. FIG. 10 shows three random unvarnished area islands a, b, and c in a sea of varnish (light area). FIG. 11 shows corresponding radii having lengths determined by the distance between the geometric centers of nearest neighbors, ab, ba, and bc. An imaginary circle (dotted line) is established for each radii. FIG. 12 shows the boundary of the sealing area which results from the superposition of the imaginary circles, and which has an area being the sum of the areas of regions a, b, c, and d. FIG. 13 shows the boundary of the sealing area as an imaginary dotted line within a sea of varnish, the varnish shown by a darkened area. The sealing area thus includes regions a, b, c, and d, but not region e. Even though varnished, region e falls outside the sealing area, and is not considered part of the sealing area.

In one embodiment, the varnish may extend beyond the boundary of the sealing area, which varnish is not part of the sealing area, and which is not considered to be part of the varnish area, V. Similarly, in one embodiment, the unvarnished area may extend beyond the boundary of the sealing area, which unvarnished area is not part of the sealing area, and which is not considered part of the print void area, PV.

Within the sealing area, the unvarnished and/or varnished areas may be arranged in a regular repeating patterned, they may be randomly arranged, or a combination thereof. If the areas are arranged in a random pattern or a combination of random and repeating patterns, the sealing area is determined using the method already described for the random pattern.

Figure 6:
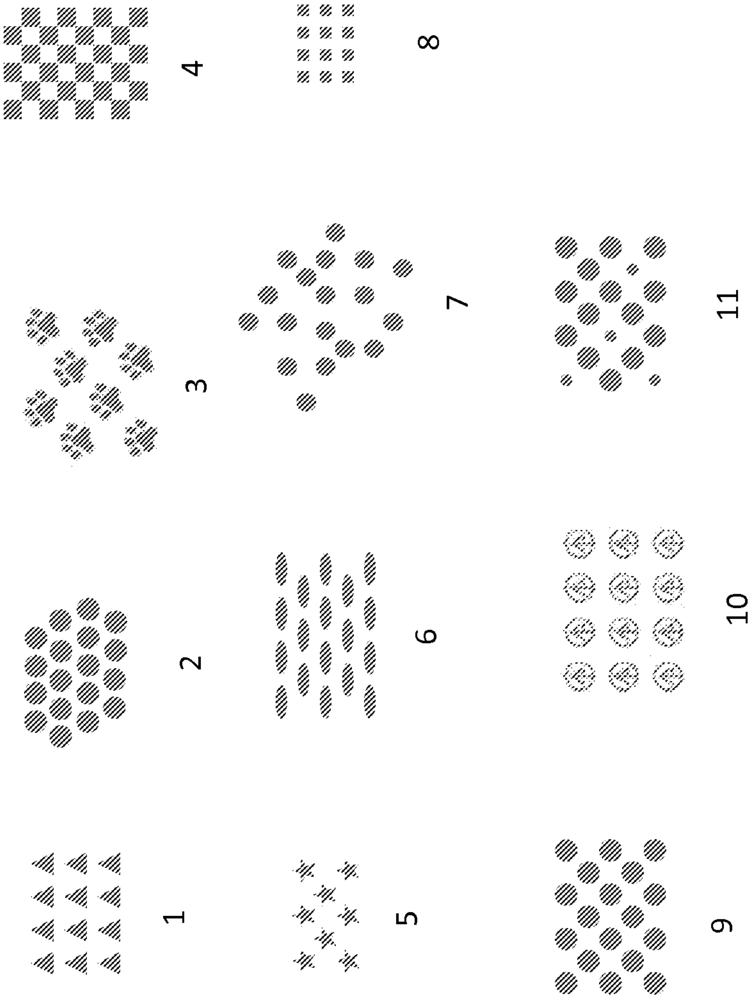
FIG. 6 shows some embodiments of patterns of bonded areas (dark areas).

Within the sealing area, the unvarnished areas may have any shape. Non-limiting examples thereof include circles, ovals, squares, rectangles, triangles, other polygons, stars, letters, numbers, images, silhouettes, logos, and the like, or any combination thereof, such as shown in FIG. 6.

Within the sealing area, the area ratio of the unvarnished areas to the varnished areas is less than or equal to 1. Within the sealing area, the total area of the combined areas of the unvarnished areas (e.g., regions a, b, and c in FIGS. 12 and 13) is referred to as the print void area, or PV. Within the sealing area, the total area of that portion having a varnish coating (e.g., region d in FIGS. 12 and 13) is referred to as the varnish area, or V. The ratio, PV:V, must be less than or equal to 1. This range includes all values and subranges therebetween, including 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, 0.095, 0.09, 0.085, 0.08, 0.075, 0.07, 0.065, 0.06, 0.055, 0.05, 0.045, 0.04, 0.035, 0.03, 0.025, 0.02, 0.015, 0.01, or any combination of two or more thereof.

By way of example, and referring to FIG. 9, the sum of all the darkened regions within the boundary (i.e., within the sealing area) equals PV, and the total area of the light region within the sealing area equals V.

Within the sealing area, the unvarnished areas may have the same size, different size, or a combination thereof. However, within the sealing area, the largest individual unvarnished area must be less than or equal to 30 $mm^2$. This range includes all values and subranges therebetween, including 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, 0.9, 0.8, 0.79, 0.785, 0.75, 0.7, 0.6, 0.4, 0.5, 0.4, 0.3, 0.25, 0.2, 0.1 $mm^2$, or any combination of two or more thereof.

In one embodiment, individual print void areas less than or equal to 30 $mm^2$ (corresponding to a circular print void of less than or equal to about 6.0 mm in diameter) may be used. In another embodiment, individual print void areas less than or equal to 0.78 $mm^2$ (corresponding to a circular print void of less than or equal to about 1.0 mm in diameter) may be used. In another embodiment, individual print void areas less than or equal to about 0.2 $mm^2$ (corresponding to a circular print void of less than or equal to about 0.5 mm in diameter) may be used.

In one embodiment, the PV:V ratio is less than or equal to 1.0 (50% print void area). In another embodiment, the PV:V ratio is less than or equal to 0.33 (25% print voids). In another embodiment, the PV:V ratio is less than or equal to 0.11 (10% print voids).

The sealing area is so-named because, when the polymer film is wrapped around an article and energy is applied, a peelable bond will be formed at the sealing area. One way to achieve the peelable bond is with the combination of PV:V≤1 and largest individual unvarnished area of ≤30 $mm^2$. When used herein, the term, "peelable bond" means a portion of the wrapping which sufficiently bonds the polymer film together but which may be peeled apart without propagating a tear through the polymer film wrapping. The peelable bond comprises bonded areas (e.g., at all or portions of the unvarnished areas in the sealing area) and at least one unbonded area (e.g., at all or portions of the varnished area in the sealing area).

Like the sealing area, in one embodiment, the peelable bond comprises at least one unbonded area and a plurality of bonded areas in sea/island relationship with one another, wherein the bonded areas appear as discrete "islands" spaced apart from one another in an otherwise continuous "sea" of unbonded area. In another embodiment, the bonded and unbounded areas may be in a checkerboard pattern, such as already discussed. Similarly, the peelable bond may be defined as the area within a boundary established by a plurality of unit cells (for a regular repeating pattern of bonded and unbonded areas) or within a boundary established by the superposition of circles having radii determined by the distances between geometric centers of nearest neighbors (for a random pattern), as already discussed.

The boundary of the peelable bond may be defined by an imaginary continuous line drawn around the outer portion pattern. In this regard, FIGS. 7-13 and their discussions are incorporated herein for purposes of determining the area and boundary of the peelable bond. Of course, the unbonded part may extend beyond the boundary of the peelable bond and, indeed, in some embodiments the unbonded part may extend to the remainder of the polymer film wrapper, but this unbonded part is not part of the peelable bond and is not part of the unbonded area.

Within the peelable bond, the bonded and unbonded areas may be arranged in a regular repeating pattern, they may be randomly arranged, or a combination thereof. If the areas are arranged in a random pattern or a combination of random and repeating patterns, the peelable bond is determined using the method already described for the random pattern.

Within the peelable bond, the bonded areas may have any shape. Non-limiting examples thereof include circles, ovals, squares, rectangles, triangles, other polygons, stars, letters, numbers, images, silhouettes, logos, and the like, or any combination thereof.

It should be clear that the pattern, size, and shape, etc., of the bonded areas in the peelable bond may be established either by the pattern of varnished and unvarnished areas, by a pattern of the element that applies energy during wrapping (e.g., in the absence of varnish), or by a combination thereof.

In one embodiment, where the peelable bond results from the application of varnish at the sealing area of the polymer film, within the peelable bond, the area ratio of the bonded areas to the unbonded area is less than or equal to 1. Within the peelable bond, the total area of the combined areas of the bonded portions (e.g., resulting from a lack of varnish) is referred to as the bonded area, or BA. Within the peelable bond, the total area of the unbonded portions (e.g., resulting from a varnish coating in that area) is referred to as the varnish, unbonded area, or VUB. The ratio, BA:VUB, must be less than or equal to 1. This range includes all values and subranges therebetween, including 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, 0.095, 0.09, 0.085, 0.08, 0.075, 0.07, 0.065, 0.06, 0.055, 0.05, 0.045, 0.04, 0.035, 0.03, 0.025, 0.02, 0.015, 0.01, or any combination of two or more thereof.

In one embodiment, individual bonded areas less than or equal to 30 $mm^2$ (corresponding to a circular bond of less than or equal to about 6.0 mm in diameter) may be used. In another embodiment, individual bonded areas less than or equal to 0.78 $mm^2$ (corresponding to a circular bond of less than or equal to about 1.0 mm in diameter) may be used. In another embodiment, individual bonded areas less than or equal to about 0.2 $mm^2$ (corresponding to a circular bond of less than or equal to about 0.5 mm in diameter) may be used.

In one embodiment, the BA:VUB ratio is less than or equal to 1.0 (50% print bonded area). In another embodiment, the BA:VUB ratio is less than or equal to 0.33 (25% bonded area). In another embodiment, the BA:VUB ratio is less than or equal to 0.11 (10% bonded area).

In another embodiment, where the peelable bond results not from the application of varnish at the sealing area of the polymer film, but from applying energy in a pattern to form bonded areas within the peelable bond, the area ratio of the bonded areas to the unbonded area is less than or equal to 1. Within the peelable bond, the total area of the combined areas of the bonded portions (e.g., resulting from energy applied to those area) is referred to as the bonded area, or BA. Within the peelable bond, the total area of the unbonded portions (e.g., resulting from a lack of energy or lack of sufficient energy applied to that area) is referred to as the unbonded area, or UB. The ratio, BA:UB, must be less than or equal to 1. This range includes all values and subranges therebetween, including 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, 0.095, 0.09, 0.085, 0.08, 0.075, 0.07, 0.065, 0.06, 0.055, 0.05, 0.045, 0.04, 0.035, 0.03, 0.025, 0.02, 0.015, 0.01, or any combination of two or more thereof.

Within the peelable bond, the bonded areas may have the same size, different size, or a combination thereof. However, within the peelable bond, the largest individual bonded area must be less than or equal to 30 $mm^2$. This range includes all values and subranges therebetween, including 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, 0.9, 0.8, 0.79, 0.785, 0.75, 0.7, 0.6, 0.4, 0.5, 0.4, 0.3, 0.25, 0.2, 0.1 $mm^2$, or any combination of two or more thereof.

In one embodiment, individual bonded areas less than or equal to 30 $mm^2$ (corresponding to a circular bond of less than or equal to about 6.0 mm in diameter) may be used. In another embodiment, individual bonded areas less than or equal to 0.78 $mm^2$ (corresponding to a circular bond of less than or equal to about 1.0 mm in diameter) may be used. In another embodiment, individual bonded areas less than or equal to about 0.2 $mm^2$ (corresponding to a circular bond of less than or equal to about 0.5 mm in diameter) may be used.

In one embodiment, the BA:UB ratio is less than or equal to 1.0 (50% bonded area). In another embodiment, the BA:UB ratio is less than or equal to 0.33 (25% bonded area). In another embodiment, the BA:UB ratio is less than or equal to 0.11 (10% bonded area).

Methods of applying energy to seal a wrapped article are known, and are not particularly limited. Any method is suitable so long as it is sufficient to bond those portions or surfaces of the polymer film wrapping desired to be bonded together. Typically, the applied energy will fuse the polymer film or a surface portion thereof together by melting. Once cooled, the melted portions crystallize to form a bond between the polymer films or surface portions thereof. Non-limiting examples of applied energies include heat, conductive heat, radiative heat, convective heat, ultrasonic welding, electromagnetic energy, laser, UV, IR, electron beam, pressure, or any combination of two or more thereof.

In one embodiment, the applied energy is that typically used commercially in the wrapping of polymer films around packaging, e.g., to wrap reams of paper. In one embodiment, the energy is applied at typical commercial temperatures, times, and pressures such as known in the art.

In one embodiment, the energy is applied to the polymer film wrapping from one side only and not from both sides of the polymer film wrapping. In this embodiment, the energy is applied from the "outside-in" of the packaging after the polymer film has been wrapped around the article. This is unlike the sealing methods used, for example, to seal the top edge of a potato chip bag, (wherein opposing heated dies apply sealing heat and/or pressure to both sides of a sealed edge). In one embodiment, the energy is applied to one or more outer surfaces of the polymer film wrapping. In one embodiment, the energy is applied to one or more outer surfaces of the polymer film wrapping while one or more of the corresponding inner surface are facing or in contact with the article to be wrapped.

The energy may be applied to the sealing area generally, e.g., to the varnished and unvarnished areas equally, or locally or only to those areas in which fusing is desired.

In the case of general application of energy, the effect of the varnish is to prevent the varnished areas from bonding to a corresponding area on a facing polymer film surface. Conversely, the unvarnished areas, lacking such protection afforded by the varnish, will fuse to a facing polymer film or surface portion thereof under the general application of energy.

In the case of localized application of energy, the polymer film or surface portion thereof will fuse or bond to a facing polymer film or surface portion thereof only at those areas where energy, or energy sufficient to effect fusing or bonding, is applied.

As mentioned previously, it should thus be clear that the bonding pattern within a peelable bond may be established either by the pattern of varnished and unvarnished areas, by a pattern of the element that applies energy during wrapping, or by a combination thereof. Patterned energy application elements, e.g., heating dies, welding platens, etc., are known.

In one embodiment, in actual practice, the PV:V ratios and/or largest individual unvarnished area in a sealing area on a polymer film may not be the same as the BA:VUB ratios and/or largest individual bonded area when that polymer film is sealed to provide the wrapping. The causes of this may be several-fold, for example, insufficient or uneven application of energy at all portions of the polymer film during wrapping, mis-alignment of folds during wrapping, and the like, which may be expected during manufacturing.

Figure 18:
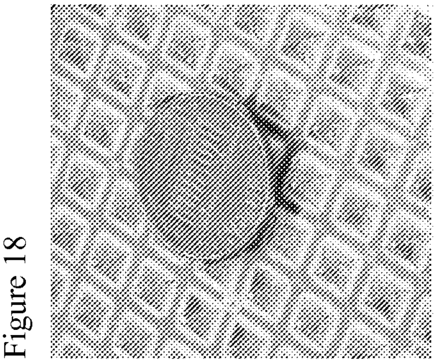
FIG. 18 shows one embodiment of a platen for heat sealing.

An alternative to applying such a varnish "screen" is to use a textured and patterned heat-seal that uses point or other contacts on the heated platen for fusing poly to poly. Thus, instead of using a flat heated platen to seal the ends of the ream, a heated platen with raised "nibs" or contact points can be used instead. Such a design is shown in FIG. 18, where nominal spacing of the raised contact points is 0.25". The heated contact points would correspond to the small non-varnished areas. One benefit of using this approach to create an easy-open poly ream wrap is that the cost of varnish—both material cost and application cost—is eliminated. A potential drawback of this approach is that the ream of paper itself may be damaged from excessive pressure of the contact points if a suitable platen design is not used. This could result in indentations on the end(s) of the ream. Variations envisioned include number of contact points per unit area, size (e.g. diameter) of the contact points, pattern of the contact points, and height of same. The combination of contact points per unit area, and their contact size are determined.

Another variation includes patterned or random appearance of the heated platen in regards to the raised "nibs" or contact points. Patterns may be designed and incorporated into the manufacturing of such platens, for example by machining. An example of a random appearance would be if the heated platen face were to be sandblasted, chemically etched, or burned with either a randomly or programmed moving high-power $CO_2$ laser. Yet another example of a random nature would be analogous to sandpaper—contact points deriving from deposition and bonding of high thermal conductivity materials onto an originally flat platen.

Non-limiting examples of heights of contact points for "spot welding" of poly to poly include those ranging from 1.0 inch down to 0.005 inch. This includes all values and subranges therebetween, including 1.0, 1, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01, 0.009, 0.008, 0.007, 0.006, 0.005 inches, or any combination of two or more thereof. The smaller of these heights may in some embodiments correspond to a chemically etched or sandblasted surface of the heated platen.

To wrap an article, the polymer film and the article are put in contact, the polymer film surrounds all or a portion of the article, and one or more portions of the polymer film are allowed to overlap with one another. Energy is applied generally or locally with the result that one or more peelable bonds are formed between one or more of the overlapping portions of the polymer film wrapping.

Figure 14:
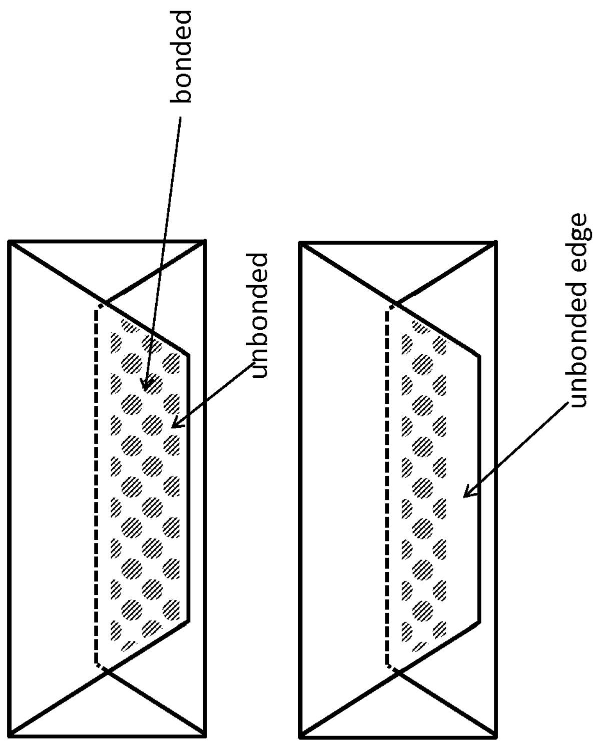
FIG. 14 shows some embodiments of an end seal of a ream wrap.

FIGS. 14 and 15 show one embodiment of an end seal of a ream wrap with bonded and unbonded portions within a peelable bond. Embodiments of unbonded edge portion are also shown.

In another embodiment, a peelable bond may be established by using a varnish having microspheres dispersed therein. The varnish having microspheres dispersed therein is applied to one or more surfaces of the polymer film and allowed to cure. The thus-coated surface is brought into contact with another surface of the polymer film, and energy is applied. The microspheres, upon the application of energy, and/or those portions of the contacting polymer film surfaces in contact with the microspheres, will melt and fuse together. Upon crystallization, bonding is established between the surfaces only or substantially only at the microspheres. The varnish will otherwise prevent the formation of bonds where microspheres are not present or not present in sufficient quantity or size to overcome the bonding preventive effect of the varnish. Thus, the use of microspheres dispersed in a varnish can also enable the formation of a peelable bond. The microsphere-in-varnish technique may be suitably used alone, or in combination with the other embodiments described herein, i.e., in combination with the PV:V, BA:VUB, or BA:UB ratios and largest bonded area of ≤30 mm$^2$.

Figure 17A:
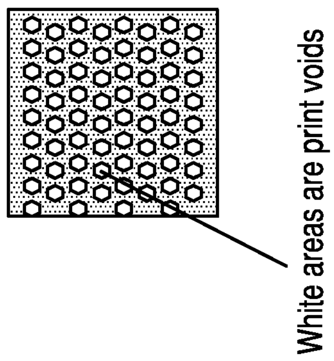
FIGS. 17A, 17B, and 17C show expanded views of embodiments of varnish coverings for the inset in FIG. 16.
Figure 17B:
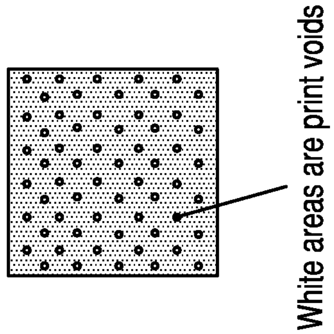
Figure 17C:
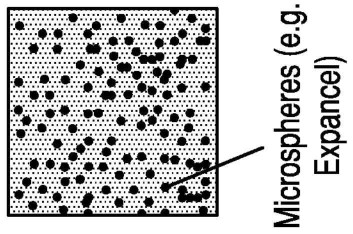

FIG. 16 shows another embodiment for end seals in a ream wrap. FIG. 17 shows expanded views of embodiments for the inset in FIG. 16. FIGS. 16*a* and 16*b* show two examples that employ the combination of PV:V ratios and largest bonded area of ≤30 mm$^2$. FIG. 16*a* depicts print voids 1 mm in diameter, patterned close together. FIG. 16*b* shows a different print pattern, with print voids 0.4 mm in diameter and spaced further apart than those in FIG. 16*a*. While both of these patterns may result in reams that open easier than current poly reams, the print pattern shown in FIG. 16*b* will require less work to open than that in FIG. 16*a*, and will be less prone to tearing of the poly wrap. The wrap in FIG. 16*a*, however, will be more effective at preventing moisture transfer into the ream than the ream in FIG. 16*b*. The PV:V in FIG. 16*b* is smaller than that in FIG. 16*a*.

The density of bonding points and/or the strength of peelable bonds may be controlled by, e.g., the concentration, size, or type of microspheres in the varnish.

The type of microspheres is not particularly limited, so long as they can fuse the polymer film surfaces or portions thereof together. Non-limiting examples of microspheres include organic polymer, biopolymer, carbohydrate, polysaccharide, starch, cellulose, glycogen, hemi-cellulose, fructan inulin, lignin, pectic substance, gum, protein, cereal, vegetable protein, animal protein, gluten (e.g. from wheat), whey protein, gelatin, colloid, natural hydro-colloid, polylactic, polygalactic, cellulosic film (e.g. microbial and/or regenerated cellulose film), thermoplastic polymer, thermoset polymer, polyolefin, polypropylene, polyethylene, LDPE, HDPE, polystyrene, polyurethane, polyvinylhalide, PVC, polyester, polyethylene terephthalate, polyamide, nylon, polystyrene, and/or non-hydrocarbon polymer, homopolymer, copolymer, oriented polymer, any combination of two or more thereof, and the like. The microspheres may be solid or hollow, may be the same or different, may be coated or surfaced modified, or any combination of two or more thereof. In one embodiment, EXPANCEL™ microspheres, which are commercially available, may be used.

The size of the microspheres is not particularly limited. Non-limiting examples of microsphere diameters include 5 to 500 microns, although they may be larger or smaller as appropriate. The aforementioned range includes all values and subranges therebetween, including diameters of 5, 6, 7, 8, 9, 10, 20, 30, 40, 50, 60, 70, 80, 90, 100, 200, 300, 400, and 500 microns, or any combination of two or more thereof.

The use of microspheres involves disrupting the surface(s) of the varnish-poly interface(s) such that poly-poly bonding is achieved at numerous discrete points, those points being where a foreign plastic material is introduced into the varnish. When such particles are added to the varnish in appropriate concentrations, numerous "point" adhesions will exist where the microspheres contact the poly wrap and fusion with the poly wrap occurs. See FIG. 4*b* as an example.

One advantage of several embodiments described herein is a much lower cost to achieve easy-opening poly wrap than installing a "rip cord" in the wrap. Examples of wraps which include rip cords for aiding the opening of the package are described in U.S. Patent Pub. No. 2006/0027637.

Another advantage of several embodiments described herein is to facilitate easy opening, but still provide adequate moisture barrier and the ends of the ream. This approach will allow a much greater area of the ream end to be sealed against moisture, but still greatly weaken the effective poly-poly bonding, which will result in a ream wrap that is not only easier to open but will also not rip apart in small pieces, which is a frustrating problem with the current bonding patterns.

EXAMPLES

The claimed subject matter may be described in further detail with reference to the following examples, but the claimed subject matter is not considered as being limited to the materials, conditions, or process parameters set forth in the examples unless otherwise specificied.

Example 1

Easy-Open Poly Wrap

Figure 19:
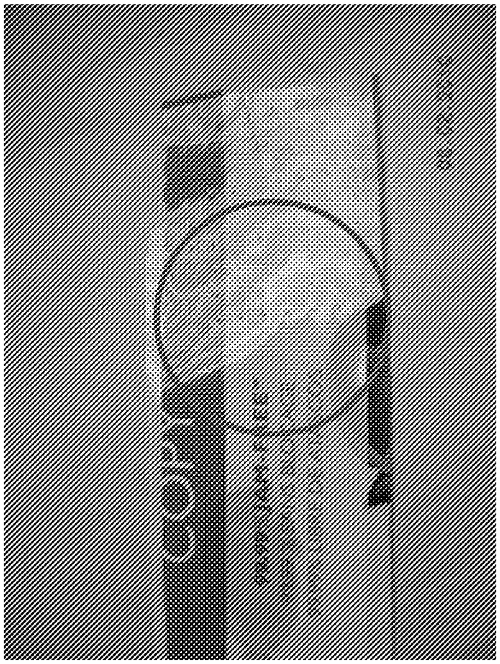
FIG. 19 shows one exemplary embodiment.

Two layers of Hammermill Copy film wrap were fused together using a textured heated platen such as shown in FIG. 18. The platen was heated in an oven at a temperature of approximately 350° F. and pressed against the film wrap using hand pressure for approximately 1 second (¼ inch of paper was used for backing underneath the poly samples). The poly films were fused at small contact points corresponding to the raised nibs in FIG. 18. FIG. 19 shows one example of patterned fusing obtained for two layers of poly using the platen in FIG. 18.

As a control, a flat platen, heated to (very approximately) 300° F. was used to fuse the same poly-to-poly as was done with the textured platen. Manually separating the fused poly samples, it was observed that samples fused using the flat platen samples were more or less permanently bonded, often and undesirably resulting in tearing when pulled apart.

Samples that were spot-welded using the textured platen could be pulled apart quite easily with minimal effort. The present experiments thus demonstrated that a range of "ease of opening" strengths can be obtained in a controllable manner by using a textured platen. This work also demonstrates that the use of varnish patterns will work also. An advantage in using a textured platen is that the cost of varnish is eliminated.

Figure 20:
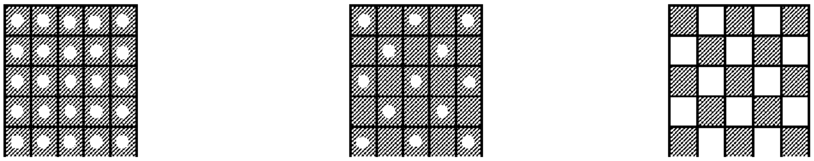
FIG. 20 shows other exemplary embodiments.

A table showing data for various embodiments of varnish patterns is shown below. The corresponding patterns are graphically shown in FIG. 20. In the table, % void is the (print void area/total area)×100 in a unit cell.

TABLE I

| Grid Dimension (mm per side) | Void Dia, mm | Void Area, mm$^2$ | % Void | PV:V |
|---|---|---|---|---|
| I. Circular Print Void centered in each grid | | | | |
| 2 | 1 | 0.785 | 19.6% | 0.244 |
| 4 | 1 | 0.785 | 4.9% | 0.052 |
| 4 | 2 | 3.142 | 19.6% | 0.244 |
| 6 | 1 | 0.785 | 2.2% | 0.022 |
| 6 | 1.5 | 1.767 | 4.9% | 0.052 |
| 6 | 2 | 3.142 | 8.7% | 0.096 |
| 6 | 3 | 7.069 | 19.6% | 0.244 |
| 6 | 4 | 12.566 | 34.9% | 0.536 |
| II. Circular Print Void centered in alternating grids | | | | |
| 2 | 1 | 0.785 | 9.8% | 0.109 |
| 4 | 1 | 0.785 | 2.5% | 0.025 |
| 4 | 2 | 3.142 | 9.8% | 0.109 |
| 6 | 1 | 0.785 | 1.1% | 0.011 |
| 6 | 2 | 3.142 | 4.4% | 0.046 |
| 6 | 3 | 7.069 | 9.8% | 0.109 |
| 6 | 4 | 12.566 | 17.5% | 0.211 |

TABLE I-continued

| Grid Dimension (mm per side) | Void Dia, mm | Void Area, $mm^2$ | % Void | PV:V |
|---|---|---|---|---|
| III. Checkerboard | | | | |
| 1 | N/A | 1.0 | 50.0% | 1.000 |
| 2 | N/A | 4.0 | 50.0% | 1.000 |
| 3 | N/A | 9.0 | 50.0% | 1.000 |
| 4 | N/A | 16.0 | 50.0% | 1.000 |
| 5 | N/A | 25.0 | 50.0% | 1.000 |
| 6 | N/A | 36.0 | 50.0% | 1.000 |

As used throughout, ranges are used as a short hand for describing each and every value that is within the range, including all subranges therein.

Numerous modifications and variations on the present invention are possible in light of the above teachings. It is, therefore, to be understood that within the scope of the accompanying claims, the invention may be practiced otherwise than as specifically described herein.

The invention claimed is:

1. A wrapping film, comprising:
a polymer film having, on at least one surface thereof, at least one sealing area comprising:
at least one varnished area; and
a plurality of individual unvarnished areas;
wherein, within the sealing area, the area ratio of the unvarnished areas to the varnished area (PV:V) is ≤1;
and wherein, within the sealing area, the largest individual unvarnished area is ≤30 $mm^2$.

2. The film of claim 1, wherein the wrapping film is a ream wrap.

3. A method for making a wrapping film, comprising:
forming, on at least one surface of a polymer film, a sealing area comprising:
at least one varnished area; and
a plurality of individual unvarnished areas;
wherein, within the sealing area, the area ratio of the unvarnished areas to the varnished area (PV:V) is ≤1;
and wherein, within the sealing area, the largest individual unvarnished area is ≤30 $mm^2$.

4. The method of claim 3, wherein the wrapping film is a ream wrap.

5. A method for making a wrapping film, comprising:
forming, on at least one surface of a polymer film, a sealing area comprising:
at least one varnished area; and
a plurality of individual unvarnished areas;
and contacting at least a portion of the polymer film with the ream of paper;
wherein, within the sealing area, the area ratio of the unvarnished areas to the varnished area (PV:V) is ≤1;
and wherein, within the sealing area, the largest individual unvarnished area is ≤30 $mm^2$.

6. The method of claim 5, wherein the wrapping film is a ream wrap.

7. A method for wrapping an article, comprising:
forming, on at least one surface of a polymer film, a sealing area comprising:
at least one varnished area; and
a plurality of individual unvarnished areas;
contacting the surface with a second surface of the polymer film; and
applying energy to at least one of the unvarnished areas to form a peelable bond between the surfaces within the sealing area;
wherein, within the sealing area, the area ratio of the unvarnished areas to the varnished area (PV:V) is ≤1;
and wherein, within the sealing area, the largest individual unvarnished area is ≤30 $mm^2$.

8. The method of claim 7, wherein the article is a ream of paper.

9. A wrapped article, comprising:
an article wrapped with a polymer film having, on at least one surface thereof, at least one peelable bond comprising:
at least one varnished, unbonded area; and
a plurality of individual bonded areas;
wherein, within the peelable bond, the area ratio of the bonded areas to the varnished, unbonded area (BA:VUB) is ≤1;
and wherein, within the peelable bond, the largest individual bonded area is ≤30 $mm^2$.

10. The article of claim 9, wherein the article is a ream of paper.

11. A method for wrapping an article, comprising:
contacting an article with a polymer film;
contacting a first surface of the polymer film with a second surface of the polymer film; and
applying energy to at least a portion of the surfaces to form a peelable bond between the surfaces, the peelable bond comprising:
an unbonded area; and
a plurality of individual bonded areas in the unbonded area;
wherein, within the peelable bond, the area ratio of the bonded areas to the unbonded area (BA:UB) is ≤1;
and wherein, within the peelable bond, the largest individual bonded area is ≤30 $mm^2$.

12. The method of claim 11, wherein the article is a ream of paper.

13. A wrapped article, comprising:
an article wrapped with a polymer film having, on at least one surface thereof, at least one peelable bond comprising:
at least one unbonded area; and
a plurality of individual bonded areas;
wherein, within the peelable bond, the area ratio of the bonded areas to the unbonded area (BA:UB) is ≤1;
and wherein, within the peelable bond, the largest individual bonded area is ≤30 $mm^2$.

14. The article of claim 13, wherein the article is a ream of paper.

* * * * *